US009525320B2

(12) United States Patent
Vuolle-Apiala et al.

(10) Patent No.: US 9,525,320 B2
(45) Date of Patent: Dec. 20, 2016

(54) ELECTROMECHANICAL DEVICE WITH INCLUDED GEAR STAGES AND INTERNAL LUBRICATION SYSTEM

(75) Inventors: Tuomas Vuolle-Apiala, Jyväskylä (FI); Jorma Tirkkonen, Jyväskylä (FI); Ville Pakarinen, Jyväskylä (FI); Jari Toikkanen, Muurame (FI); Olli Liukkonen, Lappeenranta (FI); Jorma Mustalahti, Hyvinkää (FI); Ilkka Martikainen, Lappeenranta (FI)

(73) Assignees: MOVENTAS GEARS OY, Jyvaskyla (FI); THE SWITCH DRIVE SYSTEMS OY, Lappeenranta (FI)

( * ) Notice: Subject to any disclaimer, the term of this patent is extended or adjusted under 35 U.S.C. 154(b) by 123 days.

(21) Appl. No.: 13/102,735

(22) Filed: May 6, 2011

(65) Prior Publication Data
US 2011/0273063 A1    Nov. 10, 2011

(30) Foreign Application Priority Data

May 6, 2010   (EP) ..................... 10162078

(51) Int. Cl.
*H02K 7/116*   (2006.01)
*H02K 7/08*   (2006.01)
(Continued)

(52) U.S. Cl.
CPC ............. *H02K 7/116* (2013.01); *F03D 15/00* (2016.05); *F05B 2260/40311* (2013.01);
(Continued)

(58) Field of Classification Search
CPC ................ H02K 7/116–7/1166; H02K 7/081; H02K 7/10
(Continued)

(56) References Cited

U.S. PATENT DOCUMENTS 2,436,930 A     3/1948   Mackmann
2,998,539 A     8/1961   Bessiere
(Continued)

FOREIGN PATENT DOCUMENTS

CN     101426661 A     5/2009
CN     101865084 A     10/2010
(Continued)

OTHER PUBLICATIONS

"camber." Random House Kernerman Webster's College Dictionary. 2010. 2010 K Dictionaries Ltd. Copyright 2005, 1997, 1991 by Random House, Inc. Jun. 13, 2016 http://www.thefreedictionary.com/camber.*

*Primary Examiner* — Thomas Truong
(74) *Attorney, Agent, or Firm* — Birch, Stewart, Kolasch & Birch, LLP

(57) ABSTRACT

An electromechanical device having a mechanical interface structure for connecting to an external rotating element, an electrical machine, and one or more gear stages on a mechanical power transmission path between the mechanical interface structure and a rotor of the electrical machine. The electromechanical device also has bearings for connecting the rotor of the electrical machine rotatably to the structure of the electromechanical device. The bearings carry the axial and radial forces of the rotor, and at least partly the axial and radial forces of the driving shaft of the gear stage, directly connected to the rotor.

18 Claims, 2 Drawing Sheets

(51) Int. Cl.
*H02K 7/108* (2006.01)
*H02K 7/18* (2006.01)

(52) U.S. Cl.
CPC ............ *H02K 7/085* (2013.01); *H02K 7/108* (2013.01); *H02K 7/1838* (2013.01); *H02K 2213/06* (2013.01); *Y02E 10/722* (2013.01); *Y02E 10/725* (2013.01)

(58) Field of Classification Search
USPC ............ 310/75 R, 90, 92, 99, 100, 118, 83; 475/331, 337, 263
IPC ............................................. H02K 7/116,51/00
See application file for complete search history.

(56) References Cited

U.S. PATENT DOCUMENTS

| | | | |
|---|---|---|---|
| 3,153,158 A | 10/1964 | Schmitter | |
| 3,310,691 A | 3/1967 | Wilkinson | |
| 3,812,928 A | 5/1974 | Rockwell et al. | |
| 4,398,110 A * | 8/1983 | Flinchbaugh | B25J 9/1025 310/83 |
| 4,467,230 A | 8/1984 | Rovinsky | |
| 4,505,031 A | 3/1985 | Colwell et al. | |
| 4,531,428 A * | 7/1985 | Windish | 475/279 |
| 4,922,164 A * | 5/1990 | Jacobsen et al. | 310/309 |
| 4,955,128 A | 9/1990 | Sogabe et al. | |
| 5,053,661 A | 10/1991 | Kitamura et al. | |
| 5,087,229 A | 2/1992 | Hewko et al. | |
| 5,126,582 A * | 6/1992 | Sugiyama | F02N 11/04 290/22 |
| 5,246,082 A | 9/1993 | Alber | |
| 5,272,938 A | 12/1993 | Hsu et al. | |
| 5,770,904 A | 6/1998 | Rasch et al. | |
| 6,100,615 A | 8/2000 | Birkestrand | |
| 6,133,659 A | 10/2000 | Rao | |
| 6,278,216 B1 | 8/2001 | Li | |
| 6,515,399 B1 * | 2/2003 | Lauf et al. | 310/239 |
| 6,528,918 B2 * | 3/2003 | Paulus-Neues et al. | 310/75 R |
| 6,756,719 B1 | 6/2004 | Chiu | |
| 6,864,607 B2 | 3/2005 | Hashimoto | |
| 6,944,906 B2 | 9/2005 | Moein et al. | |
| 7,057,327 B2 | 6/2006 | Kanazawa et al. | |
| 7,077,776 B2 | 7/2006 | Sorab et al. | |
| 7,228,928 B2 | 6/2007 | Mizutani et al. | |
| 7,282,823 B2 * | 10/2007 | Hilton | 310/62 |
| 7,315,099 B2 * | 1/2008 | Steffen et al. | 310/54 |
| 7,564,154 B2 * | 7/2009 | Reuter | 310/90 |
| 7,649,286 B2 | 1/2010 | Manning | |
| 7,815,536 B2 | 10/2010 | Jansen et al. | |
| 2002/0077209 A1 | 6/2002 | El-Antably et al. | |
| 2002/0121819 A1 | 9/2002 | Beatty et al. | |
| 2004/0160058 A1 * | 8/2004 | Gott et al. | 290/1 R |
| 2006/0223665 A1 | 10/2006 | Matsushita et al. | |
| 2009/0025991 A1 | 1/2009 | Moriguchi et al. | |
| 2009/0114480 A1 | 5/2009 | Madge et al. | |
| 2010/0007151 A1 | 1/2010 | Ciszak et al. | |
| 2010/0043207 A1 | 2/2010 | Son et al. | |
| 2010/0052442 A1 * | 3/2010 | Savant | 310/78 |
| 2010/0062888 A1 * | 3/2010 | Ciszak et al. | 475/31 |
| 2010/0133854 A1 * | 6/2010 | Jansen et al. | 290/1 C |
| 2010/0164232 A1 | 7/2010 | Siegfriedsen | |
| 2011/0133469 A1 * | 6/2011 | Jansen et al. | 290/55 |

FOREIGN PATENT DOCUMENTS

| | | |
|---|---|---|
| DE | 85 13 219 U1 | 5/1986 |
| DE | 41 34 553 A1 | 3/1992 |
| DE | 10 2007 012 408 A1 | 9/2008 |
| EP | 0538743 A2 | 4/1993 |
| EP | 0 811 764 A1 | 12/1997 |
| EP | 1 905 633 A1 | 4/2008 |
| EP | 2 088 316 A2 | 8/2009 |
| EP | 2 216 547 A2 | 8/2010 |
| FR | 2824965 A1 | 11/2002 |
| JP | 2009-148035 A | 7/2009 |
| WO | WO 02/095900 A1 | 11/2002 |
| WO | WO 03/031812 A1 | 4/2003 |
| WO | WO 2004/001932 A1 | 12/2003 |
| WO | WO 2005/117242 A1 | 12/2005 |
| WO | WO 2006/115132 A1 | 11/2006 |
| WO | WO 2007/051895 A1 | 5/2007 |
| WO | WO 2011-133024 A2 | 10/2011 |

* cited by examiner

ELECTROMECHANICAL DEVICE WITH INCLUDED GEAR STAGES AND INTERNAL LUBRICATION SYSTEM

FIELD OF THE INVENTION

The invention relates to an electromechanical device that is a combination of one or more gear stages and a rotating electrical machine. More precisely the invention relates to a bearing construction and structure of this kind of an electromechanical device.

BACKGROUND

In many power generating systems it may be advantageous from the viewpoints of various design and constructional aspects to connect a generator to a prime mover, e.g. a wind turbine, via a gear-box arranged to convert the rotational speed of the prime mover into a speed range suitable for the generator. Correspondingly, in many motor applications it may be advantageous to connect an electrical motor to an actuator via a gear box arranged to convert the rotational speed of the electrical motor into a speed range suitable for the actuator. The gear-box may comprise one or more series of connected gear stages with the aid of which a desired gear ratio is achieved. Each single gear stage can be, for example, a planet-gear stage or a cylindrical gear stage.

Challenging design aspects related to a combination of a gear-box and an electrical machine that can be a generator and/or a motor are, among others, the size and weight of the combination. Furthermore, equipment needed for lubricating, cooling, and monitoring the combination of the gear-box and the electrical machine may be complex compared with that of e.g. a gearless system. The reliability of e.g. the lubricating systems may require special attention because, as self-evident, both the lubricating system of the gear-box and the lubricating system of the electrical machine have to simultaneously work properly in order that the combination works properly. Therefore, for obtaining a sufficient effective or combined reliability, the reliabilities of the lubricating systems of the gear-box and of the electrical machine respectively have to be significantly higher than the reliability that would be required for a single lubricating system of a gearless system. However the gear-box, especially in many wind power applications, makes it possible to use an electrical machine that is significantly smaller in dimensions and weight than an electrical machine of a corresponding gearless system. Therefore, the choice whether to use a gear-box or to have a gearless system depends on many different aspects many of which are more or less in trade-off with each other. The gear-box provides many advantages and thus there is a need to provide technical solutions for alleviating or even eliminating the drawbacks related to the use of the gear-box.

In many special applications, such as in wind turbines for example, the size and weight of the combination of an electrical machine, such as a generator or an electrical motor, and a gear box is of a critical importance, since these features affect many other design aspects directly related to this combination. These include, among others, the support structure for the combination as well as required space for the combination.

Therefore, there is a great demand for smaller and lighter combinations of a gear-box and an electrical machine.

It should also be noted, that an electrical machine in the context of the present application may be a generator or an electrical motor.

SUMMARY

In the present invention the weight and size of the electromechanical device consisting of a gear-box having one or more gear stages and of an electrical machine, is advantageously minimized with an integrated construction of the electromechanical device.

An electromechanical device in accordance with the present invention comprises:

a mechanical interface structure for connecting the electromechanical device to an external rotating element, an electrical machine, such as a generator or an electrical motor, one or more gear stages on a mechanical power transmission path between the mechanical interface structure and a rotor of the electrical machine, and bearing means of the rotor shaft of the electrical machine, which bearing means also carry at least partially the axial and radial forces of the driving shaft of the gear stage directly connected to the rotor shaft.

The above-described electromechanical device is a combination of the electrical machine and the one or more gear stages which are integrated into a single unit and utilize at least one common bearing element. Therefore, the bearing means can be simpler and more reliable than that of a traditional bearing system in which there are separate bearings for gear-box and for electrical machine. Furthermore, the size and the weight of the electromechanical device according to the invention can be smaller than those of a traditional combination of an electrical machine and a gear-box.

In a solution in accordance with the present invention the bearings of the rotor are advantageously located between the rotor shaft and a mechanical structure fixedly connected to the frame of the gear stage directly connected to the rotor. The said mechanical structure may also be integrated in the frame of the gear stage as a part of the frame.

The present invention also makes it possible to combine the lubrication system of the one or more gear stages of the mechanical power transmission path with the lubrication of the electrical machine. This is advantageously done by combining the lubrication spaces of the gear stage or stages with lubrication space of the electrical machine with lubricant channels provided in the mechanical structure connected fixedly to the outer frame of the gear stage connected to the rotor, and to which mechanical structure the rotor is connected rotatably.

The present invention is very suitable for wind turbines, which usually consists of two planet gear stages and a generator.

In the characterizing part of claim 1 is disclosed more precisely the features that are characterizing to the solution in accordance with present invention. Other advantageous embodiments are disclosed in dependent claims.

BRIEF DESCRIPTION OF THE FIGURES

The exemplifying embodiments of the invention and their advantages are explained in greater detail below in the sense of example and with reference to the accompanying drawings, in which.

DESCRIPTION OF THE EMBODIMENT

Figure 1:
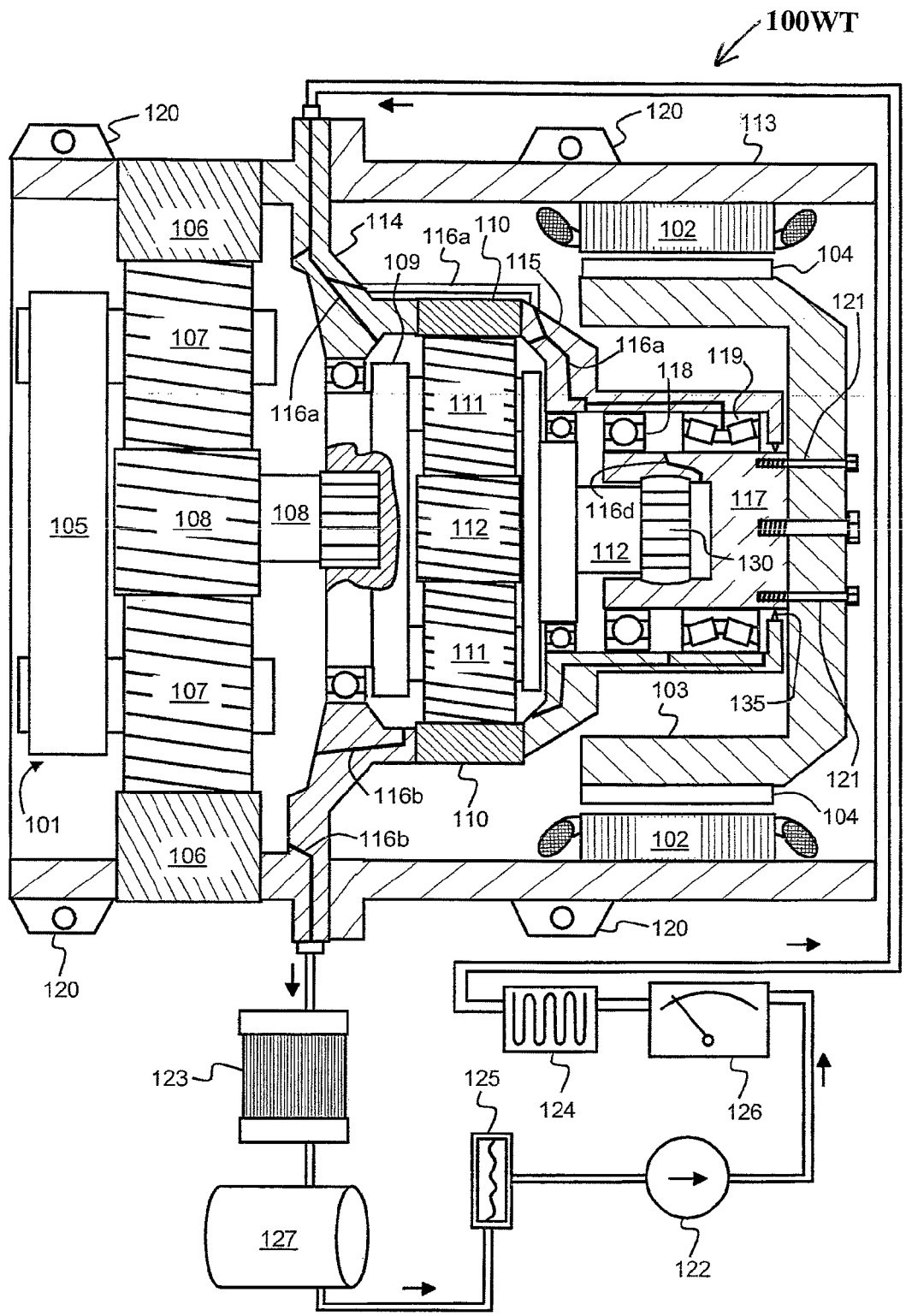
FIG. 1 shows a schematic section view of an electromechanical device according to an embodiment of the invention.

FIG. 1 shows a schematic section view of an electromechanical device according to an advantageous, exemplifying embodiment of the invention. The electromechanical device comprises a mechanical interface structure 101 for connecting to an external rotating element that can be, for example but not necessarily, a wind turbine 100WT. The electromechanical device comprises an electrical machine for converting mechanical power into electrical power or vice versa. The electrical machine comprises a laminated stator core 102 that is provided with stator windings. The electrical machine comprises a rotor 103 that includes a central part or a rotor shaft 117, a frame, and permanent magnets 104 mounted on the outer surface of the frame of the rotor 103. Naturally, it is also possible that the rotor shaft 117 and the frame of the rotor 103 are a single, monolithic piece. The electromechanical device comprises one or more gear stages on a power transmission path between the mechanical interface structure 101 and the rotor 103 of the electrical machine. The gear stages are arranged to convert the rotational speed of the external rotating element, a wind turbine, to a speed range suitable for the electrical machine. The electromechanical device comprises mechanical structures 113, 114, and 115 that are arranged to support the elements of the gear-stages and the elements of the electrical machine.

The mechanical structures 113, 114 and 115 constitute a common lubricant oil room for both the gear stages and the electrical machine. In the electromechanical device, there are oil channels 116a for directing at least a part of lubricant oil circulated in the electromechanical device to flow via the gear stages and at least a part of the lubricant oil to flow via bearings 118 and 119 of the electrical machine. Oil channels 116b are arranged to remove the lubricant oil from the electromechanical device so as to make circulation of the lubricant oil possible. The bearings shown in FIG. 1 are rolling bearings. It should be, however, noted that any of the bearings could be a sliding bearing as well, or any other type of suitable bearings. The manner, how the lubricant oil is divided into the part flowing via the gear stages and into the part flowing via the bearings of the electrical machine, depends on the arrangement of the oil channels. The oil channels may be arranged, for example, in such a manner that the lubricant oil flows first via the gear stages and then via the bearings of the electrical machine, or in such a manner that there are parallel flowing routes for the gear stages and for the electrical machine, or there can be a hybrid of these. The electromechanical device described above and illustrated in FIG. 1 is actually a combination of one or more gear stages and an electrical machine integrated into a single unit and utilizing a common lubricating system. Therefore, the lubricating system can be simpler and more reliable than that of a traditional arrangement in which there is a separate gear-box unit and a separate electrical machine unit connected to each other. Furthermore, the size and the weight of the above-described electromechanical device can be smaller than the size and the weight of the above-mentioned traditional arrangement.

In the electromechanical device according to the exemplifying embodiment of the invention illustrated in FIG. 1, the gear stages consists of a first planet-gear stage and a second planet-gear stage. The first planet-gear stage comprises a planet-wheel carrier 105, a gear ring 106, planet wheels 107, and a sun gear shaft 108. The second planet-gear stage comprises a planet-wheel carrier 109, a gear ring 110, planet wheels 111, and a sun gear shaft 112, which sun gear shaft operates as a driving shaft of the second gear stage. The planet-wheel carrier 105 of the first planet-gear stage constitutes a part of the mechanical interface structure 101 arranged to receive the mechanical power from the prime mover. Therefore, the planet-wheel carrier 105 of the first planet-gear stage is rotated by the prime mover. The gear ring 106 is stationary. The sun gear shaft 108 of the first planet-gear stage is connected to the planet-wheel carrier 109 of the second planet-gear stage. Therefore, the planet-wheel carrier 109 of the second planet-gear stage is rotated by the sun gear shaft 108 of the first planet-gear stage. The gear ring 110 is stationary. The sun gear shaft 112 of the second planet-gear stage is connected with a coupling 130 to the rotor shaft 117 of the rotor of the electrical machine. The coupling 130 is advantageously cambered so as to allow certain misalignment between the rotational axes of the sun gear shaft 112 and the central part 117 of the rotor of the electrical machine. Thus, the coupling 130 can be arranged to remove the additional loading which would be otherwise caused by the possible misalignment to the bearings 118 and 119. Furthermore, the coupling 130 allows changes in the alignment during operation. The central part 117 of the rotor comprises an oil-channel 116d for delivering lubricant oil to the coupling 130. Therefore, the rotor of the electrical machine is rotated by the sun gear shaft 112 of the second planet-gear stage. The planet gear stages have, preferably but not necessarily, floating sun gear shafts 108 and 112 and cambered couplings between the sun gear shaft 108 and the planet-wheel carrier 109 and the sun gear shaft 112 and the rotor shaft 117 in order to provide tolerance against possible mutual deviations between directions of the rotational axes of the sun gear shafts 108 and 112, and of the rotor of the electrical machine, i.e. to provide tolerance against possible alignment non-idealities. In the electromechanical device shown in FIG. 1, the sun gear shaft 112 of the second planet-gear stage is floating on support of the planet-wheels 111 of the second planet-gear stage and on support of the rotor shaft 117 of the rotor of the electrical machine. The sun gear shaft 108 of the first planet-gear stage is floating on support of the planet-wheels 107 of the first planet-gear stage and on support of the planet-wheel carrier 109 of the second planet-gear stage. It is, however, also possible that one or both of the sun gear shafts is/are bearing-mounted. In addition to the bearings and the gear stages, the lubrication system lubricates the coupling between the gear stages and the electrical machine, i.e. the coupling between the sun gear shaft 112 and the rotor shaft 117.

As can be seen from FIG. 1, the bearings system of the electrical machine, comprising bearings 118 and 119, support not only the rotor of the electrical machine but also the sun gear shaft 112 of the second planet-gear stage. The coupling 130 is advantageously arranged to deliver the axial forces from the gear stages to the bearings 118 and 119 that are common to the gear stages and the electrical machine. Hence, the bearings system of bearings 118 and 119 are used for supporting not only the rotor of the electrical machine but also at least partly the second gear stage. Therefore, the number of bearings can be smaller than in a traditional arrangement in which there are a separate electrical machine unit and a separate gear-box unit that are connected to each other. Furthermore, the number of sealed lead-throughs for rotating shafts is reduced compared with the above-mentioned traditional arrangement. A lip seal 135 is arranged to seal the room that constitutes the common lubricant oil room for both the gear stages and the electrical machine. It should be noted that the supporting of the rotor 103 of the electrical machine and at least partly the second gear stage by bearings 118 and 119 means in the context of the present invention that the bearings 118 and 119 carry the axial and radial forces of the rotor caused by electromechanical forces of the electrical machine, and at least partly the axial and radial forces of the sun gear shaft 112 caused by gears of the gear stages.

An electromechanical device according to an embodiment of the invention comprises connection elements 120 on the outer surface of the electromechanical device for attaching to an external mechanical structure. The external mechanical structure can be for example a mounting platform in a machine room at the top of a tower of a wind power plant. The mechanical structures of the electromechanical device comprise a first mechanical structure 113 supporting the stator 102 of the electrical machine with respect to the connection elements, a second mechanical structure 114 supporting the gear ring 110 of the second planet-gear stage with respect to the connection elements, and a third mechanical structure 115 supporting the rotor of the electrical machine with respect to the gear ring of the second planet-gear stage. As can be seen from FIG. 1, the first mechanical structure 113 is arranged to conduct tensions caused by electromagnetic forces acting on the stator 102 of the electrical machine to the connection elements 120 so that the tensions are arranged to bypass the mechanical structures supporting the second gear stage and the rotor. Therefore, the tensions caused by the forces acting on the stator due to e.g. electrical transients are conducted directly from the stator 102 to the connection elements 120 and thereby to the external mechanical structures.

In the embodiment of FIG. 1, the stationary gear ring 106 forms part of the frame of the first gear stage, and the stationary gear ring 110 form part of the frame of the second gear stage. It should be noted, that within the context of the present invention the stationary gear rings 106 and 110 can be enclosed within the frames of the gear stages, or these gear rings can be rotatable gear rings whereby they must be enclosed by the frames. Therefore, the frames of the gear stages, which in the embodiment of FIG. 1 comprise part of the mechanical structure 115 and the mechanical structure 114 in addition to the gear rings 106 and 110, may be manufactured as a single entities. Further, the frames of the first and second gear stage can advantageously be manufactured as a single piece, in a single casting, for example. This kind of single frame piece for both of the gear stages enhances the structural strength of the frame, and allows for better conveying of the forces from within the electromechanical device to the frame of the device and from there to the external mechanical structures through connection elements 120, for example. The whole of the mechanical structure 115, comprising the parts supporting the rotor 103 of the electrical machine, is advantageously part of the single frame piece of the gear stages.

Also, the mechanical structure 113 can be integrated as an integral part of the single frame entity of the gear stages, whereby the whole frame component of the electromechanical device can be manufactured as a single piece. This kind of frame, however, might not be optimal in view of manufacture, assembly and maintenance of the electromechanical device.

The rotor of the electrical machine can be connected to the sun gear shaft 112 of the second planet-gear stage with a safety coupling arranged to lose its grip as a response to a situation in which torque acting over the safety coupling exceeds a pre-determined limit value. With this kind of arrangement it is possible to protect the elements of the gear stages from torque spikes caused by electrical transients that may occur e.g. during a short-circuit situation. The safety coupling may comprise e.g. breaking-pins arranged to break as a response to the situation in which the torque acting over the safety coupling exceeds a pre-determined limit value. FIG. 1 depicts a system in which there are bolts 121 that may be so thin or otherwise weak that these bolts are broken when the torque exceeds the pre-determined limit value. Hence, the bolts 121 represent the above-mentioned breaking-pins. Alternatively, the safety coupling may comprise friction surfaces pressed, e.g. with springs, against each other and arranged to slip with respect to each other as a response to the situation in which the torque acting over the safety coupling exceeds the pre-determined limit value.

Figure 2:
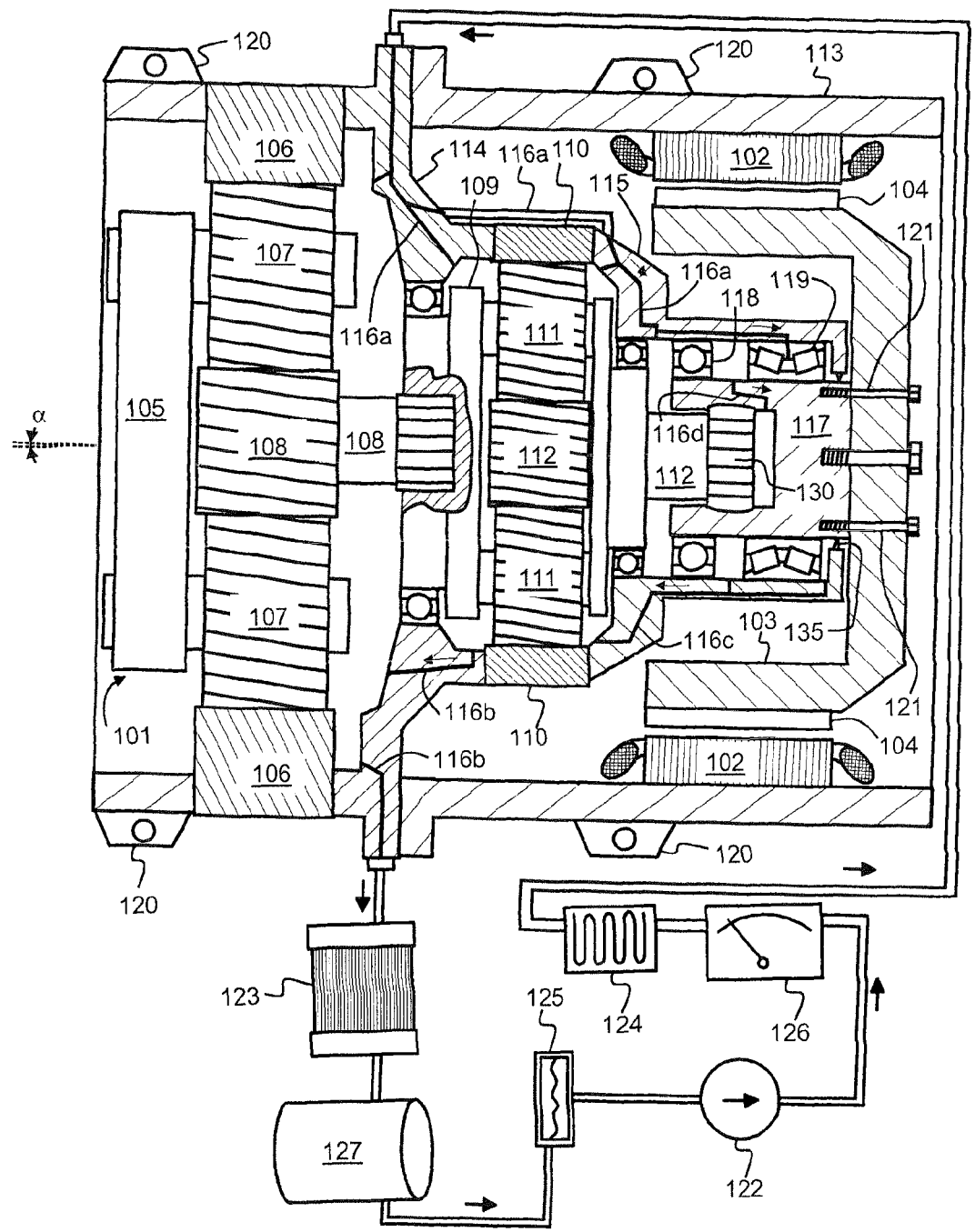
FIG. 2 shows a schematic section view of an electromechanical device according to an embodiment of the invention.

As can be seen from FIG. 1, the frame of the rotor 103 has a cupped shape opening towards the gear stages (which include elements 105-112). The mechanical structure 115 supporting the rotor 103 of the electrical machine is arranged to extend to the semi-closed space defined by the cupped shape and the bearings 118 and 119 of the electrical machine are located in the semi-closed space defined by the cupped shape. This allows the bearings 118 and 119 to be located near to the center of mass of the rotor 103 and also shortens the axial length of the electromechanical device. Therefore, the axial length of the electromechanical device shown in FIG. 1 can be smaller than the total axial length of a traditional arrangement in which there are a separate electrical machine unit and a separate gear-box unit that are connected to each other. In many applications, an electromechanical device according to an embodiment of the invention is arranged to operate in a tilted position as illustrated in FIG. 2. The tilt angle $\alpha$ that is an angle between the axial direction of the electrical machine and a horizontal line can be, for example but not necessarily, on the range 4 . . . 6 degrees. The sun gear shaft 112 of the second planet-gear stage is connected with a coupling 130 to the central part the rotor shaft 117 of the electrical machine. The coupling 130 is advantageously cambered so as to allow certain misalignment between the rotational axes of the sun gear shaft 112 and the central part of the rotor shaft 117 of the electrical machine. Thus, the coupling 130 can be arranged to remove the additional loading which would be otherwise caused by the possible misalignment to the bearings 118 and 119. Furthermore, the coupling 130 allows changes in the alignment during operation. The central part the rotor shaft 117 comprises an oil-channel 116$d$ for delivering lubricant oil to the coupling 130. The coupling 130 is advantageously arranged to deliver the axial forces from the gear stages to the bearings 118 and 119 that are common to the gear stages and the electrical machine. The mechanical structure 115 comprises a return oil channel 116$c$ that is arranged to ensure that the surface level of the lubricant oil within the mechanical structure 115 does not reach the lip seal 135 of the rotary lead-through when the electromechanical device is in the tilted position.

An electromechanical device according to an embodiment of the invention comprises an oil-pump 122 arranged to circulate the lubricant oil via the gear stages and via the bearings of the electrical machine. The electromechanical device may further comprise an oil tank 127, an oil cooler element 123 for cooling the lubricant oil, a pre-heater element 124 for warming the lubricant oil, a filter element 125 for removing impurities from the lubricant oil, and a sensor element 126 for monitoring the condition of the lubricant oil.

FIGS. 1 and 2 illustrate electromechanical device in which there are two gear stages. It should be noted that the number a gear stages is not necessarily two in electromechanical devices according to different embodiments of the invention. It is possible that, in an electromechanical device according to a certain embodiment of the invention, there is only one gear stage, e.g. a planet gear stage or a cylindrical gear stage, or that there are more than two gear stages each of which can be a planet gear stage or a cylindrical gear stage. Furthermore, concerning planet gear stages, it is not necessary that the planet-wheel carrier rotates and the gear ring is stationary as in the exemplifying construction illustrated in FIG. 1. It is also possible that the gear ring is rotated and the planet-wheel carrier is stationary. It should be also noted that the present invention is not limited to the use of permanent magnet electrical machines. The electrical machine that is integrated with the gear system can be an electrically magnetized electrical machine as well.

The specific examples provided in the description given above should not be construed as limiting. Therefore, the invention is not limited merely to the embodiments described above.

The invention claimed is:

1. An electromechanical device comprising:
a mechanical interface structure for connecting to an external rotating element,
an electrical machine,
the electromechanical device further comprising:
one or more gear stages that form a mechanical power transmission path between the mechanical interface structure and a rotor of the electrical machine, and
bearing means for connecting the rotor of the electrical machine rotatably to a structure of the electromechanical device,
wherein the bearing means carry axial and radial forces of the rotor, and at least partly axial forces of a driving shaft of the gear stage directly connected to the rotor, and the driving shaft is connected with a coupling to a rotor shaft of the electrical machine,
wherein the rotor is a cup-shaped member with a closed end, and
a depth of an interior of the cup-shaped member is deeper than a length of the rotor shaft.

2. The electromechanical device according to claim 1, wherein the bearing means are located between parts of the rotor and a frame of the gear stage.

3. The electromechanical device according to claim 1, wherein the bearing means comprises:
rolling bearings and/or sliding bearings.

4. The electromechanical device according to claim 1, wherein the electromechanical device further comprises:
a common lubricant oil room for each of the one or more gear stages and the electrical machine.

5. The electromechanical device according to claim 4, wherein the electromechanical device further comprises:
means for circulating at least part of the lubricant oil via the one or more gear stages, and at least part of the lubricant oil via the bearing means of the electrical machine.

6. The electromechanical device according to claim 1, wherein the coupling is cambered so as to allow misalignment between rotational axes of the driving shaft and the rotor shaft.

7. The electromechanical device according to claim 1, wherein the one or more gear stages consists of:
a first planet-gear stage and a second planet-gear stage,
a planet-wheel carrier of the first planet-gear stage constituting a part the mechanical interface structure,
a sun gear shaft of the first planet-gear stage is connected to a planet-wheel carrier of the second planet-gear stage, and
the driving shaft, which is a sun gear shaft of the second planet-gear stage, is connected to the rotor of the electrical machine.

8. The electromechanical device according to claim 7, wherein the rotor of the electrical machine is connected to the sun gear shaft of the second planet-gear stage with another coupling arranged to lose its grip as a response to a situation in which torque acting over the another coupling exceeds a pre-determined limit value.

9. The electromechanical device according to claim 8, wherein the another coupling is at least one bolt that fixes the cup-shaped rotor to the rotor shaft.

10. The electromechanical device according to claim 1, wherein the electromechanical device is a wind turbine.

11. The electromechanical device according to claim 1, wherein when an outer surface of the cup-shaped rotor is viewed in a radial direction, the rotor shaft of the electrical machine cannot be seen.

12. The electromechanical device according to claim 1, wherein the rotor shaft is fixed to a flat inner wall of the closed end of the cup-shaped rotor by at least one bolt.

13. The electromechanical device according to claim 1, wherein one end of the driving shaft extends in an axial direction into a hollow portion of the cup-shaped rotor.

14. The electromechanical device according to claim 1, wherein the bearing means are located between the rotor shaft and a mechanical structure fixedly connected to a frame of the gear stage directly connected to the rotor.

15. The electromechanical device according to claim 14, wherein the mechanical structure is part of the frame of the gear stage directly connected to the rotor.

16. An electromechanical device comprising:
a mechanical interface structure for connecting to an external rotating element,
an electrical machine,
the electromechanical device further comprising:
one or more gear stages that form a mechanical power transmission path between the mechanical interface structure and a rotor of the electrical machine,
two sets of bearings for connecting the rotor of the electrical machine rotatably to a structure of the electromechanical device,
wherein the two sets of bearings carry axial and radial forces of the rotor, and at least partly axial forces of a driving shaft of the gear stage directly connected to the rotor, and the driving shaft is connected with a coupling to a rotor shaft of the electrical machine, the coupling being cambered so as to allow misalignment between rotational axes of the driving shaft and the rotor shaft,
wherein, when an outer surface the rotor is viewed in a radial direction, both of the two sets of bearings, the coupling, and the rotor shaft for connecting the rotor to a structure of the electromechanical device are fully covered by the rotor.

17. An electromechanical device comprising:
a mechanical interface structure for connecting to an external rotating element,
an electrical machine, the electromechanical device further comprising:
one or more gear stages that form a mechanical power transmission path between the mechanical interface structure and a rotor of the electrical machine,
bearing means for connecting the rotor of the electrical machine rotatably to a structure of the electromechanical device, and
a stator surrounding an outer circumference of the rotor,
wherein the bearing means carry axial and radial forces of the rotor, and at least partly axial forces of a driving shaft of the gear stage directly connected to the rotor, and the driving shaft is connected with a coupling to a rotor shaft of the electrical machine,
wherein the rotor has an end portion with a flat inner surface and a flat outer surface that are parallel to each other and that have surface areas that are substantially equal to each other,
the flat inner surface of the end portion of the rotor is directly attached to one end of the rotor shaft, and
the flat outer surface of the end portion of the rotor is arranged further in an axial direction of the electromechanical device than any portions of the stator.

18. The electromechanical device according to claim 17, wherein the rotor is attached to the rotor shaft by bolts extending through the end portion of the rotor and arranged parallel to a central axis of the rotor.

* * * * *